United States Patent [19]

Weisbrodt et al.

[11] Patent Number: 4,938,401

[45] Date of Patent: Jul. 3, 1990

[54] AUTOMOBILE PASSENGER SEAT DIVIDER

[75] Inventors: Diane B. Weisbrodt; Richard G. Weisbrodt, both of Raleigh, N.C.

[73] Assignee: R&D Ventures, Inc., Raleigh, N.C.

[21] Appl. No.: 379,598

[22] Filed: Jul. 14, 1989

[51] Int. Cl.5 .............................................. B60R 7/04
[52] U.S. Cl. ..................................... 224/275; 224/277; 224/42.42; 224/42.01; 108/44; 206/335; 206/561; 296/37.15
[58] Field of Search ............... 224/273, 275, 277, 279, 224/42.42, 42.01, 42.45 R; 108/44, 45, 25, 60; D3/40; D7/37, 38, 71; 312/235.6, 235.8; 297/188, 194; 296/37.15, 37.16; 206/335, 562, 563, 561

[56] References Cited

U.S. PATENT DOCUMENTS

| | | | |
|---|---|---|---|
| D. 103,959 | 4/1937 | Wallace | D7/38 |
| D. 271,634 | 12/1983 | Rockwell | D3/40 |
| D. 272,486 | 2/1984 | Benedetti | D3/40 |
| 1,992,903 | 2/1935 | Potashnik | 108/60 |
| 2,640,595 | 6/1953 | Byford | 224/275 X |
| 2,903,311 | 9/1959 | Earhart | 108/34 |
| 3,117,534 | 1/1964 | Martland | 108/60 |
| 3,233,563 | 2/1966 | Mauchline | 108/44 |
| 3,244,025 | 4/1966 | Mackey | 108/25 |
| 4,300,709 | 11/1981 | Page, Jr. | 224/275 |
| 4,396,172 | 8/1983 | Benson | D3/40 X |
| 4,577,773 | 3/1986 | Bitel | 206/561 X |
| 4,807,760 | 2/1989 | Sussman | 206/561 X |
| 4,832,241 | 5/1989 | Radcliffe | 224/275 |
| 4,848,627 | 7/1989 | Maeda et al. | 224/275 |

FOREIGN PATENT DOCUMENTS 2604959 4/1988 France ................................ 224/277

Primary Examiner—Henry J. Recla
Assistant Examiner—Casey Jacyna

[57] ABSTRACT

An automobile passenger seat divider base unit to rest upon the rear seat of an automobile which provides easily reachable storage cylinders in which the place items such as drinks and snack cups, and two convenient storage bins in which to place items such as crayons or miscellaneous small toys. Another feature, located at the rear portion of the invention, is the unit's anchoring device which helps prevent the unit from tipping over or sliding off of the car seat. The most unique feature is that it provides a sturdy insert sleeve in which to place various insert attachment units. One such attachment is a large rectangular-shaped insert board unit whose main purpose is to serve as a safety feature for the driver of the automobile by providing him with the means to temporarily install a divider between two quarrelsome children thus creating a barrier which limits physical and visual contact between these children. An added feature of the insert board unit is that it provides privacy to the rear seat passengers while also supplying the versatility of displaying colorful and/or informative viewing material, in the form of decals, or by providing various noise making/moving articles on the insert board unit to make it mechanically appearing to children. One other such attachment is a storage unit whose purpose is to provide the option of utilizing a large storage chamber instead of the two small storage chambers on the base unit.

7 Claims, 8 Drawing Sheets

AUTOMOBILE PASSENGER SEAT DIVIDER

BACKGROUND

1. Field of Invention

This invention relates to spacial dividers, cup holders, and storage trays, specifically to those which rest upon the rear passenger seat of an automobile. The use of the automobile passenger seat divider is to provide each adjacent passenger with easily reachable storage cylinders and bins in which to place drinks, snack cups, crayons or other small items. Furthermore, the spacial divider unit provides for the use of various alternative insert attachment units such as a divider insert board unit which creates a removable barrier between two quarrelsome children, and a removable storage insert unit which has the capacity to hold larger items than that held by the smaller storage bins.

2. Description of Prior Art

Each year, many families look forward to piling into their car for a fun-filled family vacation. Although, this experience is supposed to be exciting and wonderful for all involved, it usually is the time siblings decide to misbehave the most.

Safely driving an automobile requires concentration. When this concentration is destroyed by the antics of two quarrelsome children, safety is jeopardized. Most cars, with the exception of station wagons and vans, have only one front seat and one passenger seat, which limits the options to separate these children. If only there was a way for an adult to place a barrier between these children to quiet them down or to provide various playtime alternatives.

Heretofore, an automobile passenger seat divider has not received the attention it deserves. The divider's proper use provides the driver with a means to temporarily control the behavior of the children riding in the car, thus allowing for a safer and somewhat peaceful driving atmosphere.

In relation to automobile seat dividers, there are no known prior art references to cite. Other such inventions which have bearing upon this design though, are the automobile cup holders and trays.

One such cup holder in patent No. 2,903,311 to Oscar C. Earhart, Feb. 8, 1956, consists of a base portion which rests upon a car seat, a top tray portion having holes in which to place drink cups, and three foldable support legs to hold the tray a set distance above the base. Earhart's invention though, is cumbersome since it s large size utilizes the space of a seated passenger which in turn significantly diminishes the seating space of the other passengers. Although Earhart's invention does provide spaces in which to place cups, the spaces are holes instead of cylindrical storage chambers. Earhart's invention does not provide any means to store items in storage bins, does not provide any means to prevent the unit from sliding off of the car seat, and does not provide for the use of various attachment alternatives such as a temporary divider which blocks the physical and visual contact of the two adjacent passengers or a removable storage tray.

Cup holder patent No. 3,244,125 to William E. Mackey, Sep. 9, 1963, consists of a large box-like tray having various circular shaped compartments to accomodate items such as drink cups, various rectangular shaped compartments to accomodate items such as food and tissues, and two collapsable legs of differing heights which keep the tray horizontal when placed upon a car seat. Mackey's invention though is cumbersome since it's large size utilizes the space of a seated passenger which in turn significantly diminishes the seating space of the other passengers. Mackey's invention does provide compartments for drink cups and loose items, but it does not provide any means to prevent the unit from sliding off of the car seat nor is there any provision for, or use of, various attachment alternatives such as a temporary divider which blocks the physical and visual contact of the two adjacent passengers or a removable storage tray.

Cup holder patent No. 3,233,563 to William J. Mauchline, Sep. 22, 1964, consists of a large rectangular tray having three circular openings located along the outer edge of the tray in which to place items such as drink cups, a large rectangular area in which to place food, and two hook-shaped mounting brackets located on the back side of the tray which when hooked over the back of the car seat suspend the tray horizontally, in the air. Mauchline's invention though is cumbersome since it's large size utilizes the space of a seated passenger which in turn significantly diminishes the seating space of the other passengers, and there is no provision for, or use of, various attachment alternatives such as a temporary divider which blocks the physical and visual contact of two adjacent passengers or a removable storage tray.

Finally, cup holder patent No. D272,486 to Andrew J. Benedetti, Jan. 9, 1981, consists of a single piece unit which has three circular openings. The unit's design suggests that the unit is to be permanently attached to a motor vehicle's interior providing a passenger with a space in which to place drink cups. Benedetti's invention is small and compact but it does not rest upon a car seat between two passengers, it does not provide any storage means to retain items, and there is no provision for, or use of, various attachment alternatives such as a temporary divider which blocks the physical and visual contact of two adjacent passengers or a removable storage tray.

Although there may be several other prior art references which cite the use of drink cup holders and/or storage chambers, none of them contain the distinct and unique features presented in this patent application.

Most adults, therefore, would find it beneficial to have a durable light weight automobile passenger seat divider unit which rests upon the rear passenger seat of an automobile which provides sturdy storage cylinders in which to place drinks or snack cups, provides easily reachable storage bins in which to place crayons or other small items, is anchored to the car seat to eliminate slippage, and furthermore provides the versatility of installing a divider insert board unit which creates a removable barrier between two quarrelsome passengers, or installing a removable storage insert unit which has the capacity to hold larger items than that held by the small storage bins.

OBJECTS AND ADVANTAGES

Accordingly, we claim the following as our objects and advantages: to provide a light weight, durable rear passenger seat divider unit for an automobile which provides storage cylinders located within a convenient reaching distance in which to store drinks or snack cups, provides small storage bins in which to store crayons or other small items, provides an insert sleeve in which to insert the various attachment alternatives described below, and provides an anchoring device located near the rear section of the unit which helps prevent the unit from overturning.

In addition we claim the following additional objects and advantages: to provide a variety of removable attachments units which broaden the general scope of our invention by providing a divider insert board of sufficient height to obstruct two adjacent passengers' views of each other which creates a temporary barrier between two quarrelsome passengers and which furthermore provides a flat surface on either side of the removable insert board on which to adhere colorful decals for each passenger to view, and by providing a removable storage insert unit which has capacity to hold larger items than that held by the small storage bins mentioned above.

Further objects and advantages of our invention will become apparent from a consideration of the ensuing description and the accompanying drawings.

DRAWING FIGURES

Figure 1:
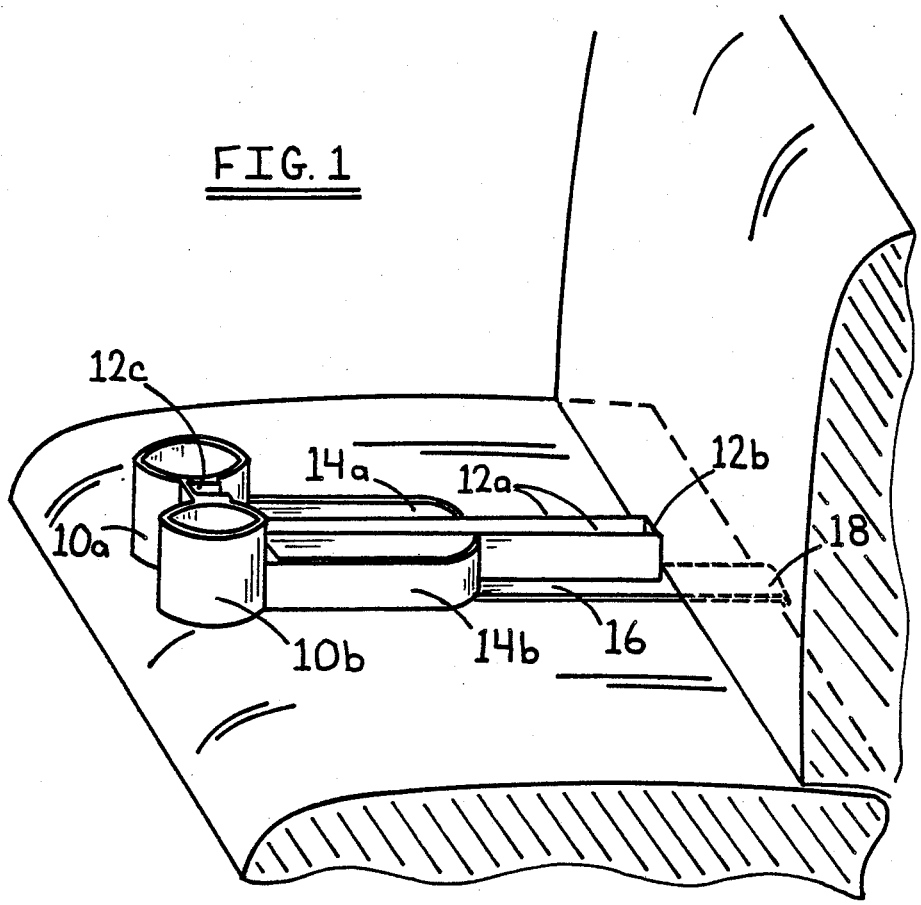
FIG. 1 shows a perspective view of the divider base unit as positioned on an automobile seat cutaway.

Reference Numerals
10a Right Storage Cylinder
10b Left Storage Cylinder
12a Insert Sleeve Side Walls
12b Insert Sleeve Rear Wall
12c Insert Sleeve Front Wall
14a Right Storage Bin
14b Left Storage Bin
16 Base Plate
18 Anchor Curve
20 Divider Insert Board
21 Divider Insert Frame
22a Storage Insert Side Walls
22b Storage Insert Rear Wall
22c Storage Insert Front Wall
24 Insert Runner
26 Cover Plate
28 Floor Board
30 Notch

DESCRIPTION OF INVENTION

Figure 2:
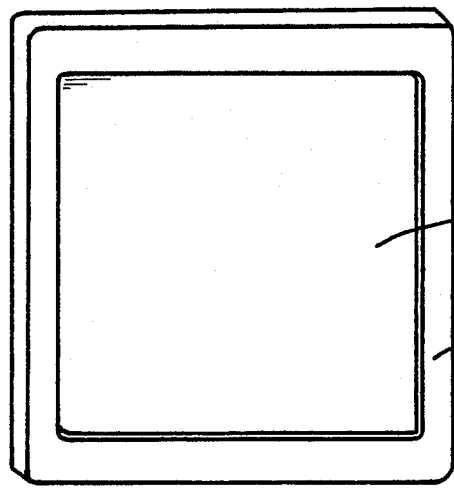
FIG. 2 shows a perspective view of the removable divider insert board.
Figure 3:
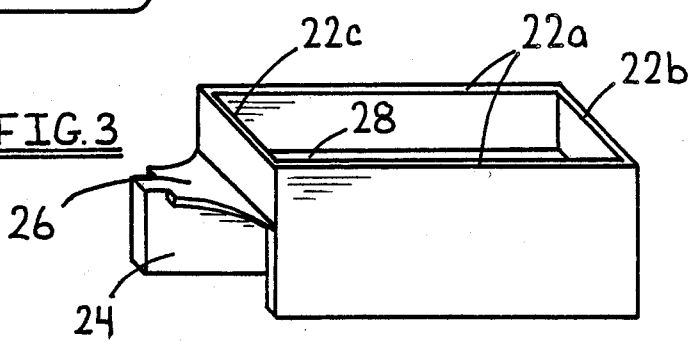
FIG. 3 shows a perspective view of the removable storage insert unit.

As shown in FIG. 1, 2, and 3 there are three individual pieces to our invention.

Figure 4:
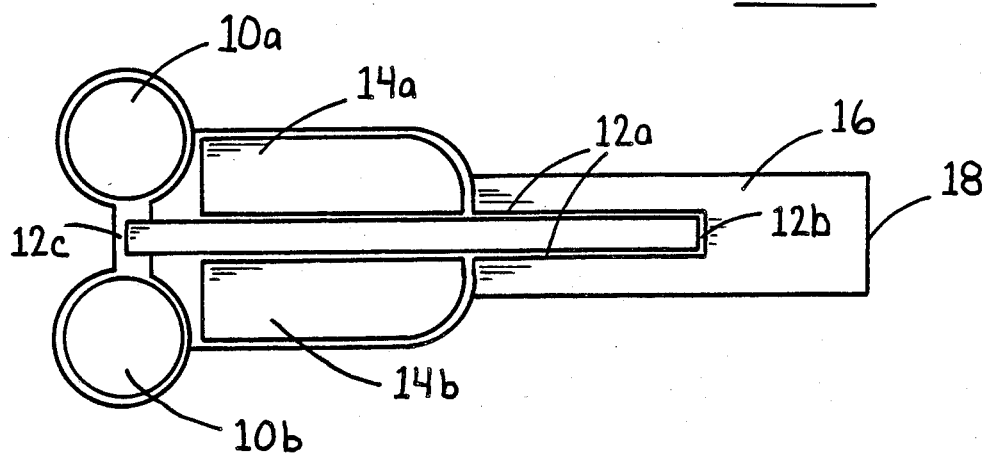
FIG. 4 shows a top plan view of the divider base unit.
Figure 5:
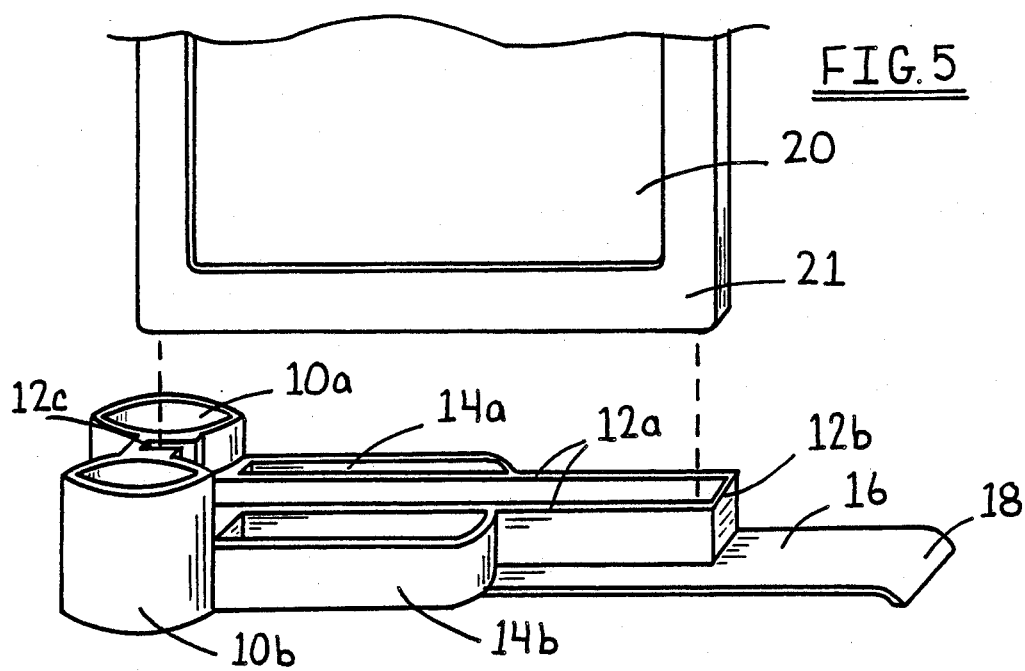
FIG. 5 shows a perspective view of the divider base unit with a sectional view of the removable divider insert board as it is being lowered into place.

The lower portion of our invention, the divider base unit detailed in FIG. 1 and 4, is a single-piece unit comprised of several distinct features and made of a polymeric material.

Storage cylinders 10a and 10b have an approximate outer diameter of 3¾-inches, an approximate inner diameter of 2¾-inches, an approximate inner depth of 2-inches, and an approximate outer height of 3-inches.

Commencing at a point between storage cylinders 10a and 10b is an insert sleeve which is comprised of four walls. The two insert sleeve side walls 12a which extend behind storage cylinders 10a and 10b have an approximate length of 14-inches, an approximate height of 1½-inches, an approximate thickness of ¼-inch, and have an inner distance approximately ¾-inches apart. These side walls are connected in the rear by the insert sleeve rear wall 12b which has an approximate height of 1½-inches, and an approximate thickness of ¼-inch. Completing the insert sleeve is the insert sleeve front wall 12c located between storage cylinders 10a and 10b having an approximate height of 3-inches, equal to the height of said storage cylinders, and an approximate thickness of ¼-inch. The combination of these four insert sleeve walls create the sleeve in which to place various removable insert units.

Located immediately behind storage cylinders 10a and 10b and adjacent to both insert sleeve side walls 12a are storage bins 14a and 14b. Storage bins 14a and 14b each have an outer wall with an approximate height of 1½-inch and an approximate thickness of ¼-inch. This outer wall commences at a point directly behind storage cylinders 10a and 10b and is spaced approximately 2-inch away from insert sleeve side walls 12a, then extends an approximate length of 5½-inches parallel to insert sleeve side walls 12a, gradually curves inward at an approximate 90-degree angle, and eventually rejoins insert sleeve side walls 12a at a point approximately 6½-inches down from its commencement point.

Located immediately behind storage bins 14a and 14b and extending beneath and behind insert sleeve rear wall 12b is base plate 16. Base plate 16 is a flat stabilizer portion of the invention having an approximate length of 9½-inches, an approximate width of 2½-inches, and an approximate thickness of ⅛-inch. The extension of base plate 16 is anchor curve 18 which has an approximate length of 1-inch, and approximate width of 2½-inches, an approximate thickness of ⅛-inch, and curves downward at an approximate 65-degree angle.

Figure 6:
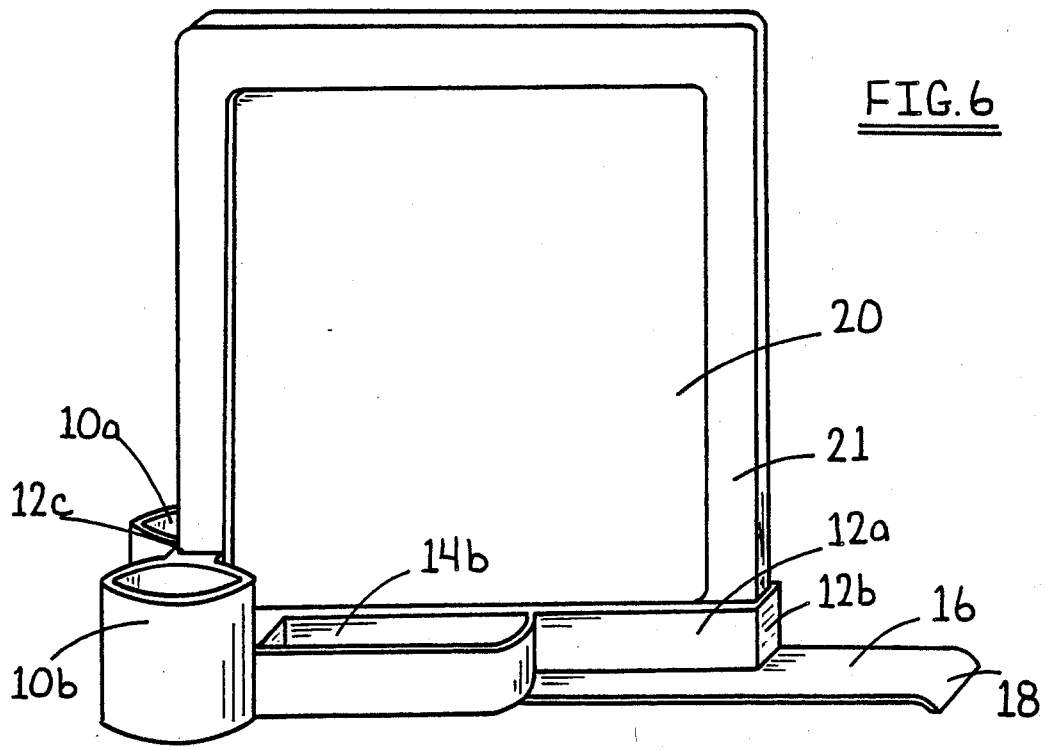
FIG. 6 shows a perspective view of the divider base unit having the removable divider insert board securely positioned into the insert sleeve.

The first of two removable insert units for our invention, as shown in FIG. 2 and 6, is the divider insert board unit which is a single-piece unit comprised of polymeric material.

The divider insert board unit is comprised of a solid smooth surface, herein referred to as divider insert board 20, having an approximate length of 14-inches, an approximate height of 15-inches, an approximate thickness of ⅝-inch, and also having a slightly raised frame ornamenting the outer edges of its smooth surface. Divider insert frame 21, which extends around the outer perimeter of divider insert board 20, has the following widths: the two sides of divider insert frame 21, which are approximately 15-inches in length, have an approximate frame width of 1-inch, and the top and bottom portions of divider insert frame 21, which are approximately 14-inches in length, have an approximate frame width of 1½-inches. The purpose of the larger frame width along the top and bottom of divider insert frame 21 is to differentiate those two ends which are to be placed into the insert sleeve of the divider base unit.

Figure 7:
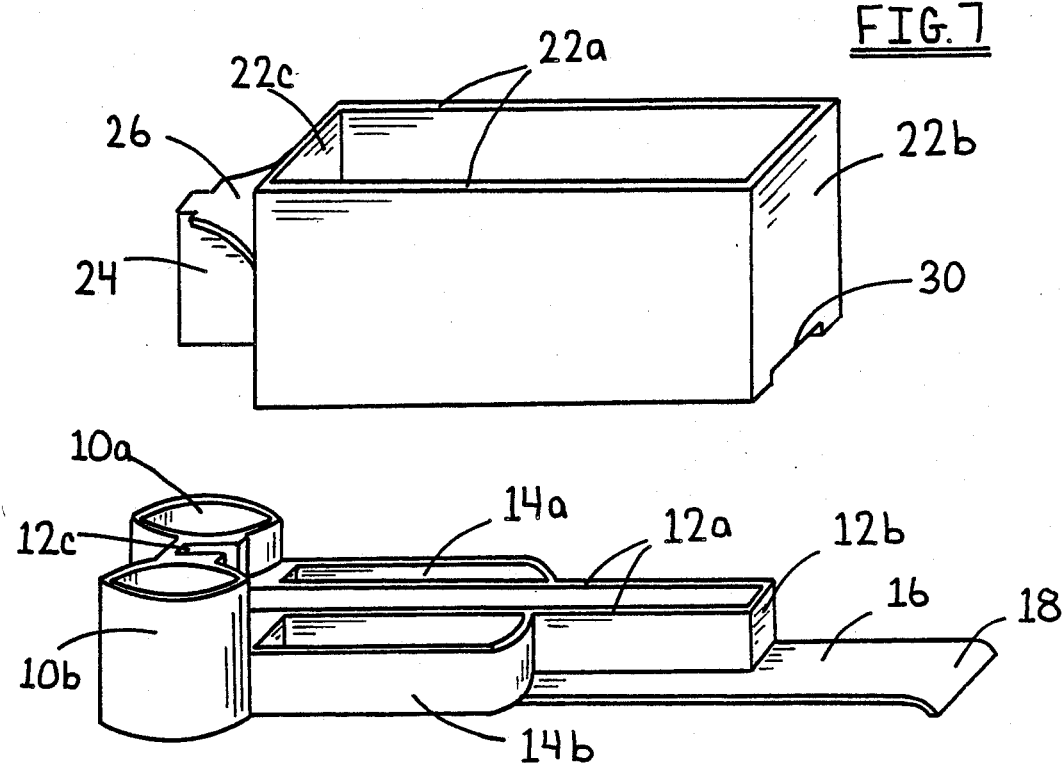
FIG. 7 shows a perspective view of the divider base unit and the removable storage insert unit as it is being lowered into place.

The second of two removable insert units for our invention, as shown in FIGS. 3 and 7, is the storage insert unit. The storage insert unit is a single-piece unit comprised of polymeric material.

Figure 8:
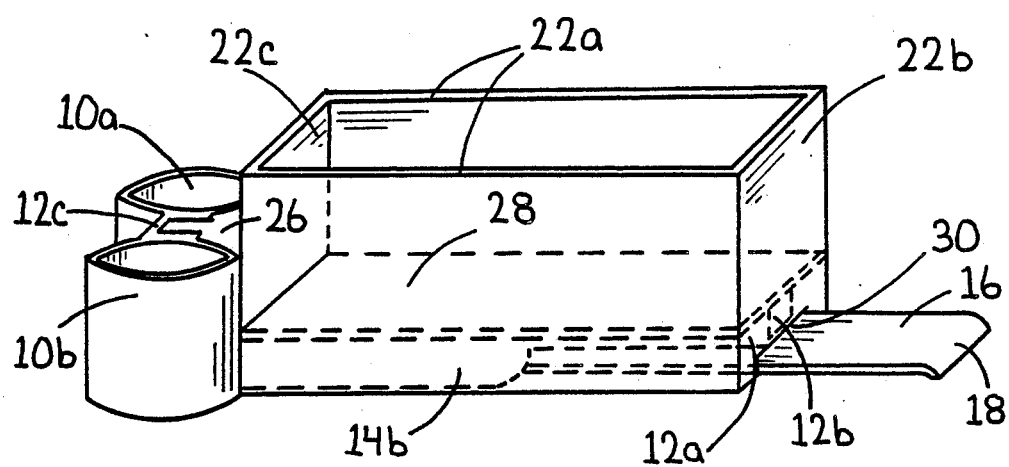
FIG. 8 shows a perspective view of the divider base unit having the removable storage insert unit securely positioned into the insert sleeve while furthermore showing in dotted lines the floor board of the storage insert unit and that part of the divider base unit which is now enclosed.

The storage insert unit has four outer walls whereby the two storage insert side walls 22a have an approximate length of 12¾-inches, an approximate height of 5-inches, and an approximate thickness of ¼-inch. The shorter walls have differing designs. Storage insert rear wall 22b has an approximate length of 5½-inches, an approximate height of 5-inches, and an approximate thickness of ¼-inch. Furthermore, storage insert rear wall 22b has an approximate ½-inch high by 2⅝-inch long notch 30 centrally located along its bottom portion allowing storage insert rear wall 22b to straddle base plate 16 when the storage insert unit is attached to the divider base unit as shown in FIG. 8. Storage insert front wall 22c has an approximate length of 5½-inches, an approximate thickness of ¼-inch, but has an approximate height of 3½-inches up from floor board 28 as described below.

Located within the storage insert unit's four outer walls is floor board 28. Floor board 28 is flat in shape having an approximate length of 12¼-inches, an approximate width of 5-inches, an approximate thickness of ¼-inch, and is positioned approximately 3¼-inches from the top of the storage insert unit's outer walls. The combination of storage insert walls 22a, 22b, and 22c along with floor board 28 form the topless rectangular shaped storage chamber shown in FIG. 9.

Figure 10:
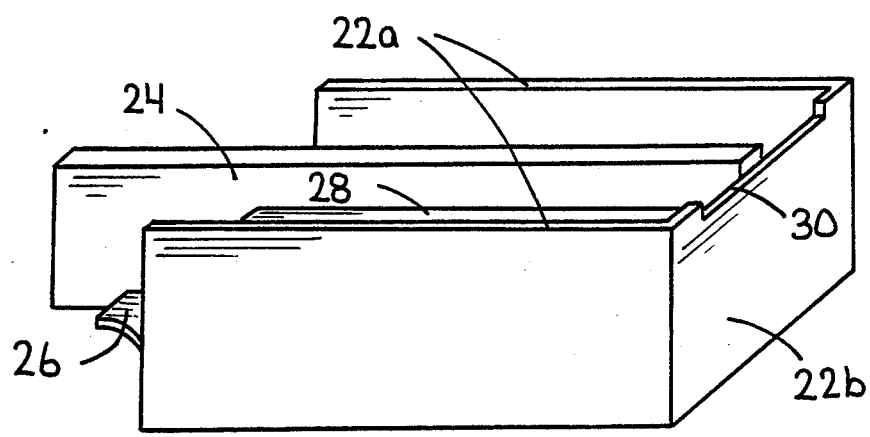
FIG. 10 shows a perspective view of the removable storage insert unit as viewed from below.

Running centrally along the underside of floor board 28 is insert runner 24 as shown in FIG. 10. Insert runner 24 begins approximately ⅜-inches from the inner side of storage insert rear wall 22b and extends lengthwise toward storage insert front wall 22c. Insert runner 24 has an approximate length of 14-inches, an approximate width of ⅜-inch, and has an approximate height of 1¼-inches for approximately the first 12-inches which then extends up to an approximate height of 3-inches for the remaining 2-inches of its length. The top portion of the remaining 2-inches of insert runner 24 is shaped to form cover plate 26.

Figure 9:
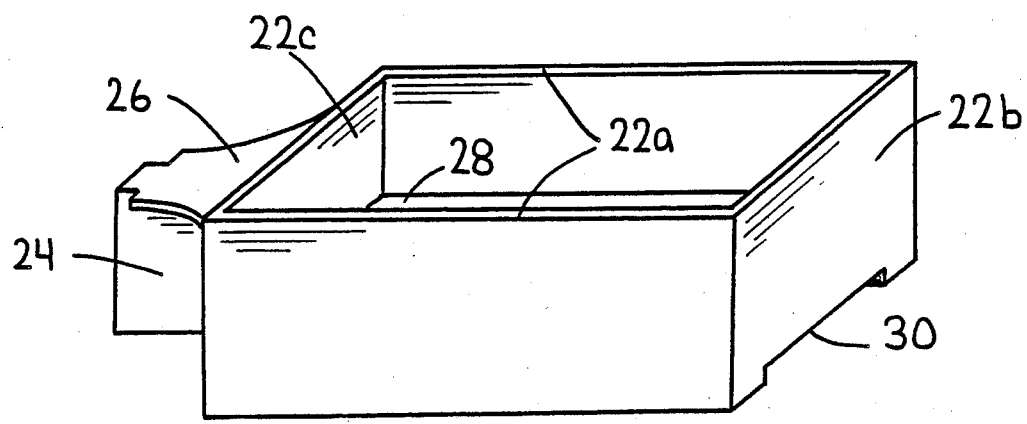
FIG. 9 shows a perspective view of the removable storage insert unit as viewed from above.
Figure 11:
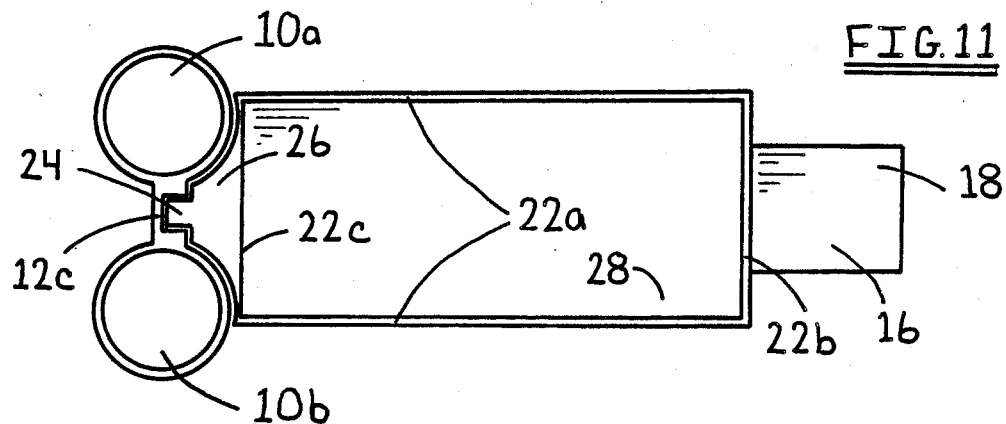
FIG. 11 shows a top plan view of the divider base unit when the removable storage insert unit is in its place.

As shown in FIG. 8 and 9, cover plate 26 begins approximately ½-inch from the front end of insert runner 24 then forms a curve on both sides of insert runner 24 with said curve contouring the outer circumferences of storage cylinders 10a and 10b. The curves of cover plate 26 end at the points where side walls 22a come into contact with storage cylinders 10a and 10b as shown in FIG. 11.

Operation of Invention

The individual components, detailed in FIG. 1, FIG. 2, and FIG. 3, perform several distinct functions.

The divider base unit of our invention, shown as FIG. 1, contains three storage features. Storage cylinders 10a and 10b serve as the front stabilizers for the unit which also provide the users of the invention with two easily reachable storage cylinders in which to place items such as drinks and snack cups. Storage bins 14a and 14b, located behind storage cylinders 10a and 10b, provide the users of the invention with two convenient storage bins in which to place items such as crayons or small toys. Finally the insert sleeve, shown as reference numerals 12a, 12b, and 12c, located along the central portion of our invention, provides the holding slot in which to insert and securely support the various insert attachment units such as the insert board unit or the storage insert unit shown as FIGS. 2 and 3.

The rear stabilizer portion of the invention is base plate 16. Base plate 16, which extends behind storage bins 14a and 14b and runs parallel to and behind insert sleeve walls 12a and 12b, provides the appropriate amount of support necessary to prevent the invention from tipping over when the various insert attachment units are in their proper position. Furthermore, that extension of base plate 16 which curves downward to form anchor curve 18, serves as the anchoring mechanism which, when positioned into the crack located between the car's seat cushion and back rest, helps to secure the invention onto the passenger seat and prevents the invention from sliding forward.

The insert board unit, shown as FIG. 2, is a separate single-piece structure which is to be securely inserted into insert sleeve walls 12a, 12b, and 12c. Once inserted, and the entire unit is positioned in the center of the automobile's rear passenger seat, the insert board unit serves as a temporary barrier or divider which separates the passengers on either side of it providing a simple solution to the problem of quarrelsome children while furthermore providing each child with a colorful divider insert to view while traveling.

The storage insert unit, shown as FIG. 3, is a separate single-piece structure which is to be securely positioned over the rear portion of the divider base unit. The storage insert side walls 22a, rear wall 22b, front wall 22c, and floor board 28 are combined to form a spacious box-like storage chamber in which to place loose items such as toys, books, or the like. This box-like structure is held in place by the use of insert runner 24 which is to be securely inserted within insert sleeve walls 12a, 12b, and 12c located on the divider base unit. Located at the front end of insert runner 24 is cover plate 26. The purpose of cover plate 26 is to plug up the holes found on either side of insert runner 24 when the storage insert unit is placed into position over the divider base unit. The final feature of the storage insert unit is notch 30 which serves as the opening in which to position the extension of base plate 16 when the storage insert unit is in use.

Thus the reader will find the invention of FIGS. 1, 2, and 3 advantageous since it provides for a light-weight, yet durable rear passenger seat divider unit which provides the rear seat passengers with two easily reachable storage cylinders in which to place items such as drinks and snack cups, two convenient storage bins in which to place items such as crayons or small toys, while also providing the means to temporarily create a barrier between these passengers which will, in turn, solve any misbehavior and/or noise level problems created in the rear seat of the automobile, and furthermore providing the rear seat passengers with the option of utilizing a larger storage chamber in which to place items such as books or larger toys.

While the above descriptions and accompanying drawings may contain many specifications, the reader should not interpret these as limitations on the scope of the invention. The overall concept of the invention may remain the same, even though the dimensions and/or scope of the various pieces can readily be altered. For example, there may be interchangeable insert board units each having different colorful decals which correspond with varying age groups of the children viewing it. Various noise making/moving articles may also be attached to the insert board unit making it mechanically appealing to children. Furthermore, there may be several other insert attachment units varying in design and utility which would be specified in a later patent application. Hence, the reader is asked not to limit the scope of the invention by the descriptions stated above or by the accompanying drawings, but to determine its scope by the appended claims and their legal equivalents.

We claim:

1. An automobile seat divider unit comprising a divider base unit and an insert unit:

said divider base unit having;

a base plate having first and second end portions and opposite side portions extending between said first and second end portions, an elongated insert sleeve disposed on said base plate having first and second end walls and two side walls connecting said first and second end walls and defining means to securely support said insert unit wherein said first end wall is located adjacent said first end portion of said base plate, said second end wall is located intermediate said first and second end portions of said base plate and said two side walls are centrally located between said opposite side portions of said base plate, and a plurality of storage cylinders providing means to securely support a standard sized drinking cup and a plurality of storage bins providing means to retain items, whereby at least one of said storage cylinders and at least one of said storage bins are disposed adjacent each side of said two side walls of said insert sleeve and on said base plate, wherein the second end portion of said base plate extending past the second end wall of said insert sleeve has means to hold said divider base unit onto an automobile seat cushion;

said insert unit having;

means for insertion into said insert sleeve and means for placing articles thereon to be carried.

2. The automobile passenger seat divider of claim 1, wherein said divider base unit is a single piece of polymeric material.

3. The automobile passenger seat divider of claim 1, wherein said means for insertion of said insert unit further comprises a single piece insert board complementally shaped to said insert sleeve to be received and secured within said insert sleeve, and said means for the placing of articles comprises the surfaces of said insert board, said insert board being sized to provide a barrier with means to visually separate two passengers located on said automobile seat on each side of said divider.

4. The automobile passenger seat divider of claim 3, wherein said insert board is made of polymeric material.

5. The automobile passenger seat divider of claim 1, wherein said insert unit further comprises a single piece storage insert, said means for the placing of articles comprises a plurality of walls and one floor board combined to form a large rectangular shaped storage chamber providing means to retain medium sized articles, said means for insertion comprises an elongated insert runner positioned beneath said floor board and being complementally shaped to said insert sleeve to be received and secured within said insert sleeve.

6. The automobile passenger seat divider of claim 5, wherein said storage insert further comprises a cover plate providing the means to close up any unnecessary holes when said storage insert is in use, and a rearwardly located notch of sufficient size providing means to insert the second end portion of said base plate.

7. The automobile passenger seat divider of claim 5, wherein said storage insert is made of polymeric material.

* * * * *